United States Patent [19]

Minch

[11] Patent Number: 5,230,367
[45] Date of Patent: Jul. 27, 1993

[54] QUIET HIGH PRESSURE REDUCING VALVE

[75] Inventor: Richard B. Minch, Woodinville, Wash.

[73] Assignee: Xemet, Incorporated, Redmond, Wash.

[21] Appl. No.: 785,689

[22] Filed: Oct. 31, 1991

[51] Int. Cl.⁵ .......................... F16K 3/02; F16K 3/32; F16K 11/16
[52] U.S. Cl. ............................ 137/625.28; 137/625.3; 137/625.33; 137/375; 251/251
[58] Field of Search ...................... 137/625.28, 625.33, 137/625.3, 625.31, 375; 251/208, 251

[56] References Cited

U.S. PATENT DOCUMENTS

| | | | |
|---|---|---|---|
| 2,734,529 | 2/1956 | Harrison | 137/625.33 X |
| 3,625,252 | 12/1971 | Bermel et al. | 137/625.3 |
| 5,054,522 | 10/1991 | Kowanz et al. | 137/625.28 X |
| 5,074,333 | 12/1991 | Martin | 137/625.31 X |

FOREIGN PATENT DOCUMENTS

| | | |
|---|---|---|
| 809503 | 7/1951 | Fed. Rep. of Germany ......................... 137/625.28 |
| 0983369 | 12/1982 | U.S.S.R. .......................... 137/625.28 |

*Primary Examiner*—Arnold Rosenthal

[57] ABSTRACT

The present invention relates generally to fluid flow control valves and more particularly to orifice assemblies of the type which are continuously adjustable wherein a high pressure reduction is divided into multiple smaller pressure drops to reduce total audible noise generation, flow is divided into multiple paths of small dimensions to reduce total audible noise level, suppress the low frequency audible noise levels, disperse the audible noise over a wider spectrum to avoid intense peaks, cavitation and erosion damage to the valve are reduced without the need for expensive special materials, pressure reduction is achieved by adaptive reduction in area as well as friction resulting efficient use of energy, the actuator energy and force requirements are low due to force balancing design, yet the valve is energy efficient and fast.

9 Claims, 8 Drawing Sheets

QUIET HIGH PRESSURE REDUCING VALVE

BACKGROUND OF THE INVENTION

In fluid flow systems it is often necessary to reduce the fluid pressure, often several hundreds of pounds per square inch, in order to control the fluid flow. This becomes necessary due to either varying input pressure, such as from a steam boiler whose pressure varies, or when the output pressure must be controlled, as when driving the turbine of a propulsion system whose speed varies with flow rate.

For liquids, pressure drops of this magnitude are accompanied by cavitation and intense audible noise. Cavitation occurs in a liquid system when the pressure is reduced below the vapor pressure of the liquid, at which time vapor bubbles form in the liquid. These vapor bubbles subsequently collapse or implode, generating shock waves in the liquid and resulting in noise and severe erosion of the valve materials.

Additionally, audible noise is emitted by any process for reducing fluid pressure, as a portion of the fluid's turbulent energy goes into audible noise. The audible noise can be hazardous to nearby personnel and disfunctional to systems which must operate quietly.

Heretofore, various devices have been used to control or reduce noise in pressure reduction devices, including mufflers, diffusers, attenuation chambers and absorption materials. Directly related prior art includes combination valve/diffusers wherein multiple paths are provided for the fluid flow such that the pressure is dropped in increments within each such path.

Typical of these are Bates U.S. Pat. No. 4,567,915, White U.S. Pat. No. 3,802,536 and Self U.S. Pat. No. 3,954,124 wherein multiple cylinders each containing a plurality of fixed diameter orifices are arranged coaxially with the total flow being controlled by a plug which can be moved down the center of the innermost cylinder such that it covers or uncovers more or fewer orifices as more or less flow is required.

Another typical configuration is represented by Seger U.S. Pat. No. 4,221,037, Kay U.S. Pat. No. 3,917,222 and Barb U.S. Pat. No. 3,894,716 wherein multiple annular disks each containing tortuous paths are stacked with said paths providing radial flow from the center of the stacked disks and total flow being controlled by a plug which is moved down the center of the annulus such that it covers or uncovers more or fewer orifices as more or less flow is required. This alternative is expensive to fabricate and susceptible to plugging. Furthermore, maintaining the disks in alignment is difficult.

The adiabatic pressure drop of a compressible fluid flowing through an orifice with friction is defined by the following equation:

$$\frac{dP}{P} = \frac{(k^*M^2)}{(1-M^2)} * \left(\frac{dA}{A}\right) -$$

$$\frac{k^*M^2(1 + (k-1)^*M^2)}{2^*(1-M^2)} * \frac{4^*f^*dx}{D}$$

where "dP" is the pressure drop, "P" the pressure, "dA" the change in the orifice area "A", "k" the ratio of specific heats of the fluid, "M" the Mach number, "f" the friction coefficient, "dx" the length of the friction path and "D" the hydraulic diameter of the friction path. Thus there are two ways to effect a pressure drop: (1) Reducing the area "A" of a single orifice by an amount "dA" (where a reduction in "dA" is a negative number), or (2) Increasing the friction length "dx" or the friction coefficient "f".

None of the above referenced patents, as well as other multistage-multipath valve configurations, vary the size of the orifices to control flow; they only vary the total number of the orifices, that is they rely on varying "M" by changing the mass flow rate to vary "dP", with the area "A" of each orifice being fixed. It is desirable in quiet valves to maintain the Mach number "M" below about 0.4 since the audible noise increases as approximately the eight power of the velocity (Sound Pressure Level SPL=f(V⁸)). Thus to maintain a low audible noise level, it is desirable to be able to vary the pressure drop dP independently of the Mach number "M", i.e. by varying the area "A". Roberts U.S. Pat. No. 3,645,298 teaches pressure reduction through moving two orifice plates relative to each other (similar to a standard gate valve), but only claims fast valving action, not the above described benefits of separately varying orifice area "A" to achieve audible noise reduction.

A second common treatment of the above described problems, is to effect a pressure drop "dP" by forcing the fluid through a high friction path, i.e. a path with a high coefficient of friction "f" and a long length "dx". The above referenced configurations all embody tortuous or labyrinthine flow paths to effect pressure reductions. For example, Roberts U.S. Pat. No. 3,645,298 places multiple orifice plates in series with each plate of a length ("dx" in the above equation) to achieve the "desired pressure drop" from the friction. (He does not move the plates relative to each other.) For high velocity fluids, such flow creates intense audible noise.

Pressure reduction effected by expansion through a short orifice, i.e. with "dx" small so that there is little friction, is nearly isentropic so that the potential energy of the source is largely converted to kinetic energy which is available to do useful work, as for example the turbine example given above. Pressure reduction through friction, as cited n the above referenced patents, converts a portion of the pressure source's potential energy into thermal energy via friction which is then not available to do useful work. Thus it is desirable to reduce the pressure by methods in addition to friction in order to conserve the potential energy of the fluid source, i.e. make the valve energy efficient. This is contrary to the art as exemplified by Baumann U.S. Pat. No. 3,715,098.

To minimize the length over which the fluid flow transitions from turbulent flow which is noisey to laminar flow which is quiet, it is often desirable to create capillary and orifice shapes with high friction coefficients "f", circlular cross-sections having the smallest friction coefficient with shapes deviating from a circle showing increasing friction coefficients "f" as the ratio of major to minor axis of the cross-sectional shape increasingly deviates from one.

In addition to limiting the absolute levels of radiated acoustic noise, it is often desirable to limit the low frequency portion of the spectrum of the acoustic noise since lower frequencies are transmitted greater distances. The frequency of the acoustic noise from a jet issuing from an orifice is approximately proportional to the fluid velocity and inversely proportional to the orifice diameter, i.e., F=S*V/d where "F" is the frequency, "S" is the Strouhal number and "d" is the orifice diameter. Thus it is desirable to make the orifice diameter "d" small to increase the frequency "F". It is also desirable to vary the diameters "d" of the multiple orifices within a valve component to spread the total acoustic power radiated over a wide frequency range to avoid intense pure tones. It is also desirable to have a cross-sectional shape with major and minor axes which are substantially different such that there are in effect multiple diameters with the result that the resulting audible acoustic is dispersed over a number of frequencies in accordance with the above formula.

It is also desirable to control the fluid flow rapidly in order to minimize the effects from fluctuations in the pressure of the fluid source. This means that a valve must often respond from fully open to fully closed in less than 0.1 second while operating against the large forces, often thousands of pounds in nominal steam flow applications, created by rapidly changing the momentum of the fluid flow (i.e. the direction of fluid flow) during valve closing. It follows that it is desirable to design a valve so that such forces are balanced against one another and the net force required to actuate the valve is low.

Closing valves against high velocity fluids requires large amounts of energy because of the large forces required to change the direction of the fluid and the long distances of travel of valve components against these forces from fully open to fully closed. Therefore, it is also desirable to minimize the travel distance from fully open to fully closed to minimize the work that the actuator must perform. Furthermore, when fast valve response is required, it is desirable to minimize the actuator work in order to minimize the required actuator energy (work per unit time) and therefore actuator size, cost and actuator power consumed. The prior art does not incorporate these features.

Pressure reductions in high velocity fluids can cause the condensation droplets which impinge upon valve surfaces causing severe erosion of the surface leading to premature valve failure. Heretofore, this necessitated valves constructed of special erosion resistant materials. The erosion rate can be approximated by the following equation:

$$\log(ER) = 4.8 * \log(Vn) + 0.67 * \log(dia) - 16.65 - \log(NEA)$$

where "ER" is the rationalized erosion rate, "Vn" the component of the droplet velocity normal to the valve component surface, "dia" is the droplet diameter of the condensed fluid and "NEA" is the material erosion resistance number. The prior art has been to use materials of high "NEA", for example Stellite 6 which has an "NEA" value of 30 versus austenitic stainless steels (common valve materials for low performance valves) which have "NEA" value of approximately 1. Materials with a high "NEA" value are expensive and difficult to fabricate making erosion resistant valves expensive. It is desirable to design a valve to limit the diameter of the droplets "dia" and also to limit the normal component of the velocity "Vn" as an alternative to using high "NEA" materials.

It is also desirable for a fluid control valve to be self-cleaning, i.e. for the orifices to be able to release foreign particles contained in the fluid before valve operation is impaired.

SUMMARY OF THE INVENTION

Accordingly, it is a general objective of the present invention to provide a novel and useful quiet-high-pressure-reducing valve in which all of the above described various difficulties accompanying the prior art have been overcome.

Embodiments of the present invention feature N valve plates with N−1 interfaces there between. Each valve plate contains multiple capillaries spaced approximately one capillary diameter apart. The capillary diameter and shape will vary with the application, as explained later, but generally the useful size as measured by the occluded diameter of the capillaries will exceed 0.020 inches or 500 micrometers with 25% to 50% of the valve plate area being occupied by said capillaries. In the first embodiment of the present invention alternate valve plates are fixed with the intervening valve plates movable. In the second embodiment of the present invention only the Nth valve plate is fixed with the preceding N−1 valve plates movable. Orifices are formed as a result of the overlap of valve plate capillaries occasioned by the juxtaposition of adjacent valve plates forming contiguous paths of N capillaries connecting N−1 adjustable orifices. The orifices formed at adjacent plate interfaces are individually adjusted (i.e., each movable valve plate being individually adjusted) or adjusted as a group (i.e. all movable valve plates being adjusted simultaneously, either the same amount or different amounts for each valve plate) to accommodate a variety of valve operating conditions in order to maintain its quietness, i.e. low audible noise levels.

The embodiments described above allow multiple fluid flow paths with multiple orifices in each said path with the diameter of said orifices being adaptively adjustable by the movement of adjacent valve plates from a fully open position (i.e., where the capillaries of the contacting adjacent valve plates are aligned perfectly) to a fully closed position (i.e., where the capillaries of adjacent valve plates overlap totally), and a multitude of intermediate open positions (i.e., where the capillaries of the contacting adjacent valve plates overlap to some degree greater than zero and less than 100%).

Each set of orifices can thus be individually adjusted to obtain the desired pressure drop "dP" by varying "dA" while holding the Mach number "M" at each stage below a desired level to minimize audible noise level. Thus a specific objective of the invention is to provide a high pressure drop valve in which the pressure drop is performed in stages such that at any individual stage the velocity is held below a desirable level, and to minimize the audible noise level, by independently varying the orifical area. Also, by this provision according to the invention, a liquid fluid is caused to undergo progressive pressure reduction in multiple stages such that cavitation does not develop, and severe wear of the valve device due to erosion does not occur. Furthermore, cavitation generated noise and vibration are also suppressed.

Another objective of the invention is to provide a high pressure drop valve of a construction wherein a plurality of fluid paths of capillary dimensions is provided such that low frequency audible noise is suppressed. Also by this provision according to the invention, the audible noise can distributed in frequency by varying the size of the capillaries within the cross-section of the N plates.

Still another objective of the invention is to provide an energy efficient quiet-high-pressure reducing valve wherein a significant fraction of the pressure drop is due to an isentropic change in area, i.e. the potential energy of the high pressure source is converted to kinetic energy versus the use of fluid friction devices such as those patents cited above which convert a portion of the potential energy of the high pressure source into thermal energy (via friction) which is then not available to do useful work.

By off-setting each of the N valve plates relative to each other, the forces due to the change in direction of the fluid within a single valve plate, on entering the capillaries are offset by the opposite forces when the fluid exits the same plate making the net force for entry plus exit nearly zero Thus another objective of the invention is to provide a quiet-high-pressure-reducing valve which requires low actuator force by balancing the fluid forces on each valve component such that they offset one another leaving a near zero net force. Also, by this provision according to the invention, the energy required to activate the valve is reduced by the said reduced actuation force and the small distance each valve plate must be moved to effect flow control from a fully open position to a fully closed position or vice versa.

Another objective of the invention is to provide a quiet-high-pressure-reducing valve of a construction wherein the fluid velocity is largely tangential to the valve component surfaces and in which the droplet size of condensed liquids is limited by the diameter of capillaries so that superior erosion resistance with ordinary valve materials is achieved.

Still another objective of the invention is to provide a low cost quiet-high-pressure-reducing valve incorporating an erosion limiting design. Also, by this provision according to the invention, an objective is to provide techniques which allow the cost effective fabrication of valve plates containing a large number of capillaries.

Another objective of the invention is to provide a quiet-high-pressure-reducing valve which has fast response as permitted by the small distances which the movable valve plates must travel between the fully open and fully closed positions, said distances being on the order of one capillary diameter.

Other objectives and further features of the invention will be apparent from the following detailed description with respect to the preferred embodiments of the invention when read in conjunction with the accompanying drawings.

DESCRIPTION OF THE PREFERRED EMBODIMENTS

Figure 1:
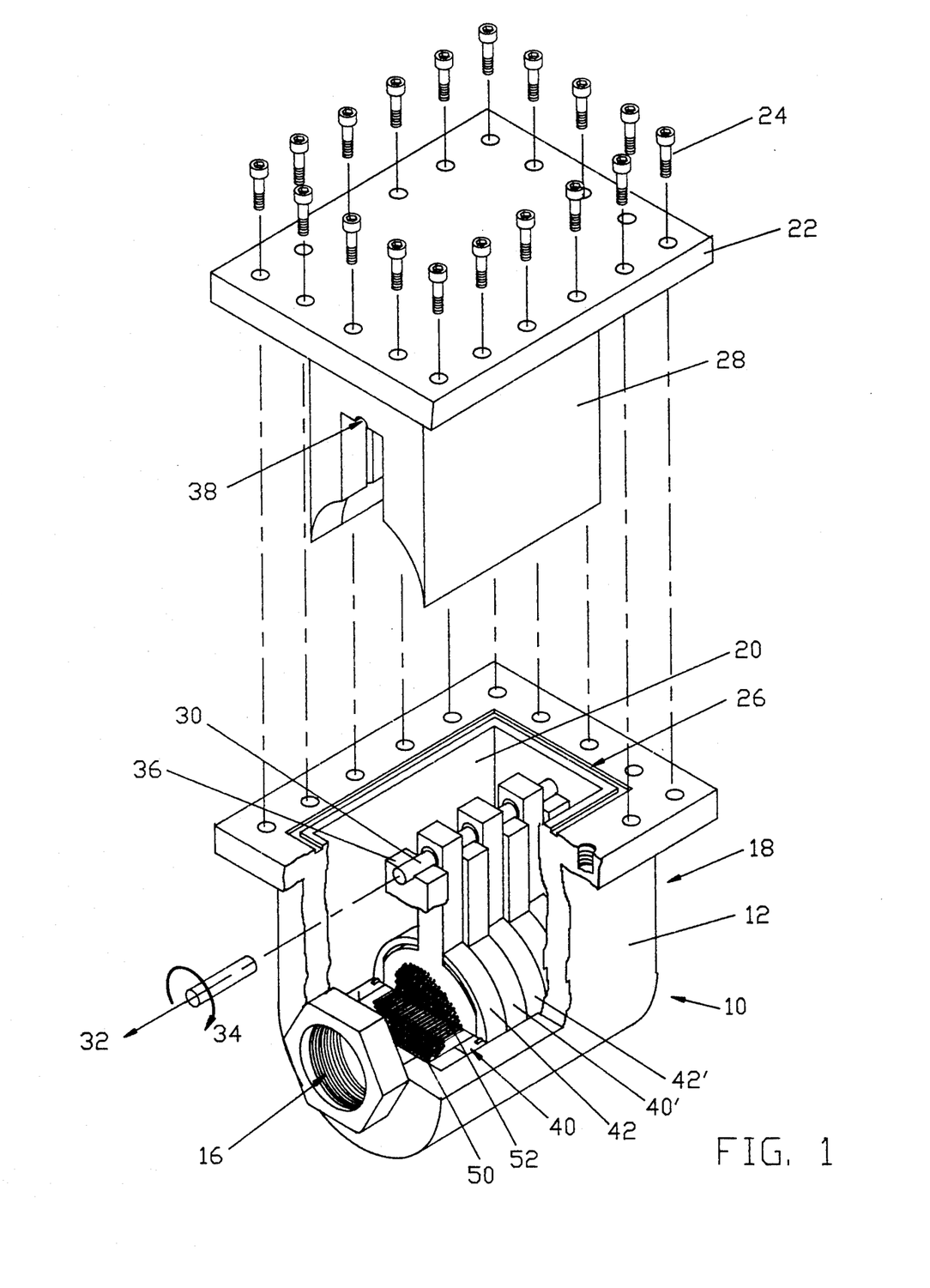
FIG. 1 is a perspective view of the quiet-high-pressure-reducing valve of the present invention.

Referring to FIG. 1, the first embodiment of the quiet-high-pressure-reducing valve 10 according to the present invention has a valve body 12 having two ends at which a fluid inlet 16 and a fluid outlet 18 are respectively provided and having at its center a valve chamber 20 communicating with the fluid inlet and outlet. The valve body 12 is closed by a flange 22 affixed to the valve body by multiple bolts 24 with a fluid tight seal being effected by an O-ring in a groove 26 with said flange 22 having an integral housing 28 which is more fully described below.

Figure 2:
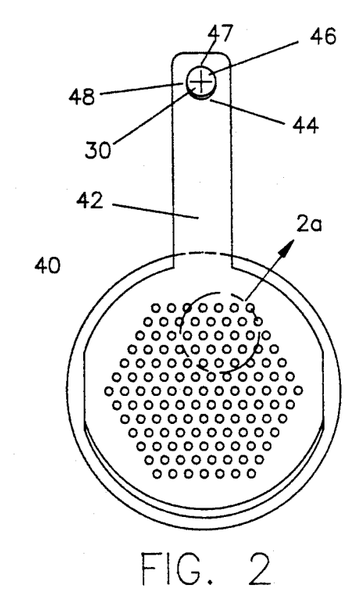
FIG. 2 is an end view of the quiet-high-pressure-reducing valve showing the movable and fixed valve plates as viewed from the valve inlet or valve outlet, said valve plates containing multiple capillaries.
Figure 3:
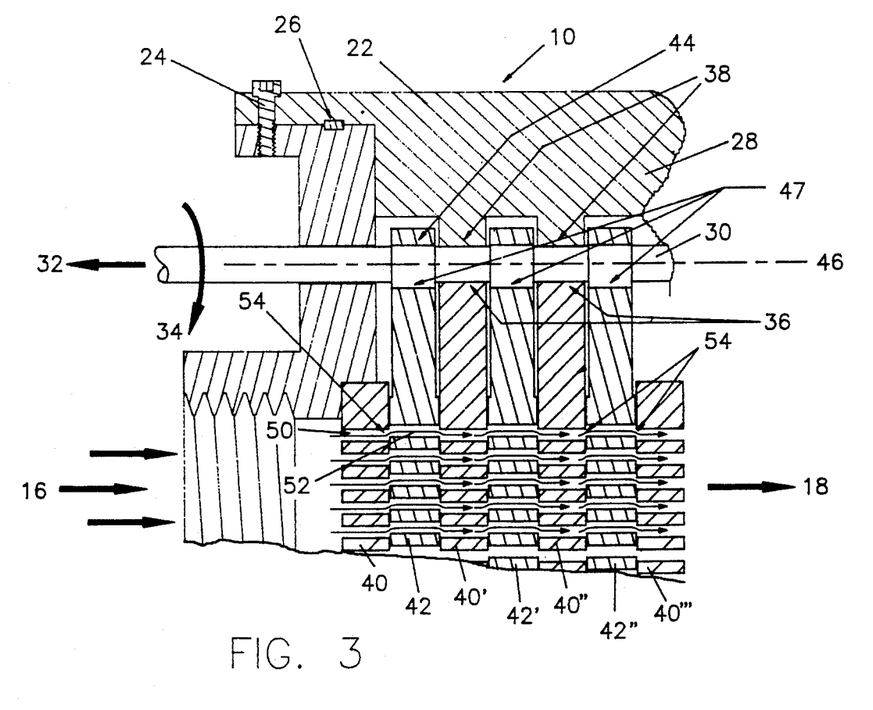
FIG. 3 is an elevation view, in longitudinal cross-section, showing the orifice-forming valve plates according to the invention.

In the first embodiment of the invention, within the valve chamber 20, are $(N+1)/2$ fixed valve plates 40 separated by $(N-1)/2$ movable valve plates 42 where N is an odd integer between 3 and 13 inclusive. The fixed valve plates contain multiple capillaries in their cross-section 50 and the movable valve plate contain multiple capillaries 52 of the same size and shape as the fixed valve plates such that when aligned, the capillaries 50 and 52 provide a contiguous straight path through the N valve plates; the movable valve plates being actuated by a camshaft 30 connected to an actuator 32 providing a torque 34. When actuated by the actuator 32, the camshaft rotates in the direction of the torque 34 within the two bearings surfaces 36 and 38, the upper bearing surface 38 residing in protrusions on housing 28 and the lower bearing surface 36 residing in fixed valve plates 40, with said protrusions mating with the upper surface of the fixed valve plates 40 such that bearing surface 38 and bearing surface 36 together form a complete circular containing bearing surface for the camshaft 30. The housing 28 contains recesses between said protrusions for camshaft 30 to engage bearing surfaces 44 in movable valve plates as depicted in FIG. 2 and FIG. 3. Examples of such actuators are stepper motors, solenoids, and similar motion-producing devices commonly used to effect mechanical motion.

A practitioner in the art would be able to alter the depicted structure to permit individual actuation of each movable valve plate 42 or simultaneous actuation of a set of movable valve plates 42, which set includes either more or less than all movable valve plates 42 of the valve apparatus 10.

The multiple capillary structures from which the valve plates are fabricated can be formed by a process described by Roberts U.S. Pat. No. 3,645,298 wherein a bundle of composite rods, with each rod comprising a metal core covered by a tubular sheath of a second metal, said bundle being constricted through a die by a process such as extrusion or rod drawing whereby the cross-sectional area of the bundle is reduced and therefore each individual rod/sheath element of the composite structure is also reduced in cross-sectional area. Illustrative of the process is the case where the rods are a copper based alloy and the sheaths are stainless steel tubing. After constriction, the valve plates are machined to a final configuration and the multiple central cores, which have been reduced in size by the constriction process, are chemically removed. Alternatively, multiple closely spaced holes can be drilled in a metal billet or formed by a sinker EDM machine, or a similar process, said holes then being filled with matching slugs of a second metal, and the whole assembly constricted by extrusion, rod-drawings or some similar process. By this process holes and matching slugs can be made in cross-sectional shapes other than circular resulting in shaped capillaries. The final configuration is then machined into valve plates and the second metal removed by chemical means leaving a capillary structure. Other processes for making capillary materials will be evident to those skilled in the art of composite materials.

FIG. 2 depicts an end view, as viewed from either the inlet 16 or the outlet 18, of a fixed valve plate 40 superimposed upon the underlying movable valve plate 42. The movable valve plate is actuated by rotation of the camshaft 30 by an actuator 32, said camshaft within the bearing surface 44 contained in the movable valve plate 42, movement being effected by the center of the camshaft lobe 48 being offset from the center of the cam 46, rotation of the camshaft by torque 34 causing movement of movable valve plate 42 relative to valve plate 40 by an amount equal to the height of the camshaft lobe from fully off to fully open to fluid flow with proportional opening sizes there between being effected by rotating the camshaft angular amounts between the fully off and the fully open positions.

Figure 2A:
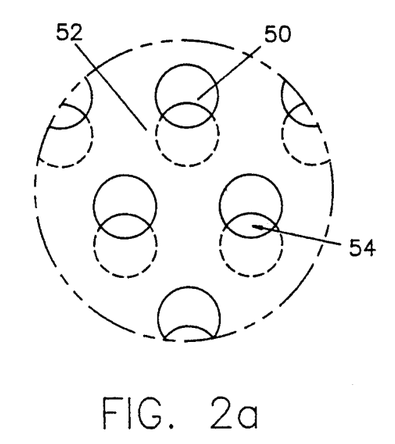
FIG. 2a is an enlarged partial view of FIG. 2 showing the formation of orifices by overlapping capillaries in adjacent valve plates.

FIG. 2a is an enlargement of FIG. 2 showing the capillaries 50 contained in valve plate 40 overlapping the capillaries 52 in movable valve plate 42 when the movable valve plate has been displaced relative to the fixed valve plate by a rotation of the camshaft 30 forming multiple orifices 54. The orifices are variable in size depending upon the rotational location of the camshaft lobe 48 relative to the movable plate bearing surface 44 and range from fully closed wherein capillaries 50 and 52 do not overlap to fully open wherein capillaries 50 and 52 are coincident.

FIG. 3 shows a longitudinal cross-sectional view of the valve 10, with a valve housing 12 containing an inlet 16 and an outlet 18 for the special case where total number of valve plates N=7, namely the four fixed valve plates 40, 40', 40", and 40'" separated by three movable valve plates 42, 42' and 42" which are engaged by the camshaft lobes 47 such that the rotation 34 of the camshaft 30 causes the movable valve plate orifices 52 to move relative to the fixed valve plate orifices 50 thereby varying the area "A" of each of the multiple orifices 54 as shown in FIG. 2a in each of the N−1 interfaces formed by the (N−1)/2 movable plates with (N+1)/2 fixed valve plates thereby controlling the fluid flow from the inlet 16 to the outlet 18 in N−1 stages. The thickness of each movable valve plate and of each fixed valve plate is determined by the desired frictional path lengths "dx" of the multiple capillaries 52 in the movable valve plates 42 and the multiple capillaries 50 in the fixed valve plates 40 which are desired following each of the N−1 stages of pressure reduction. The each of the (N−1)/2 movable valve plates being moved different distances with respect to their adjacent fixed valve plates by making the distance of the camshaft lobe 47 from the center of the camshaft 46 different for each camshaft lobe depending upon the desired area "A" of each of the multiple orifices desired at each stage of the pressure drop.

Figure 4:
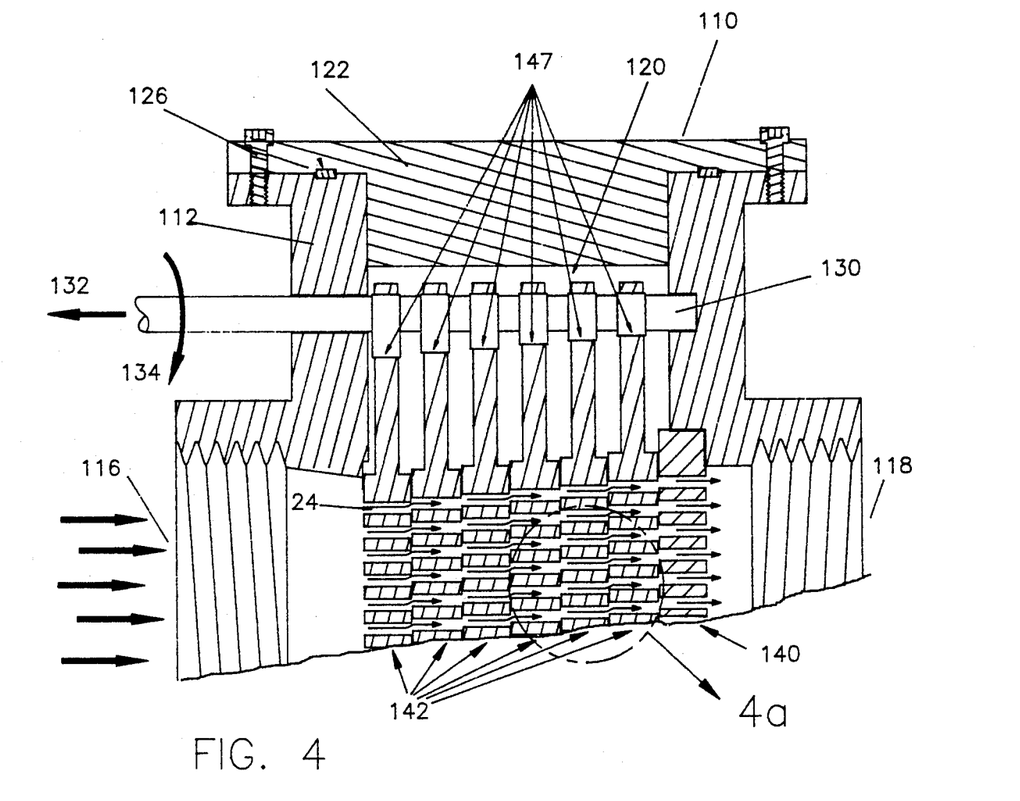
FIG. 4 is an elevation view, in longitudinal cross-section, showing the orifice-forming valve plates of the balanced force configuration of the high-pressure-reducing valve according to the invention.
Figure 4A:
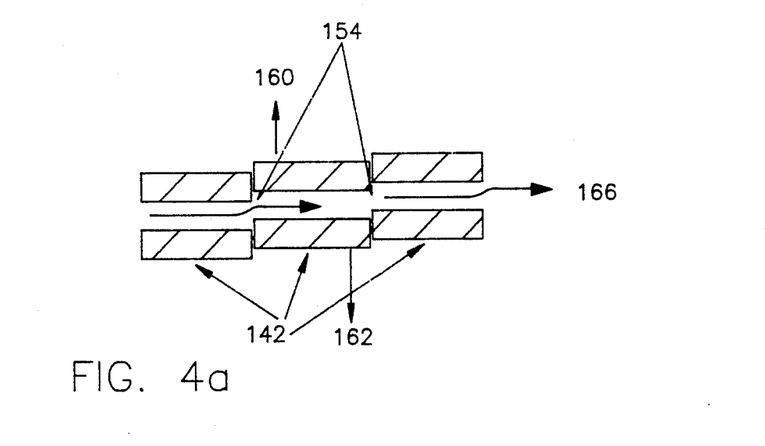
FIG. 4a is an enlarged partial view of FIG. 4 showing the formation of orifices by overlapping capillaries in adjacent valve plates with said valve plates to be off-set in a manner so that the fluid forces offset one another.

In the second embodiment of the invention, referring specifically to FIG. 4 within the valve chamber 120 which is in communication with an inlet 116 and an outlet 118, are N valve plates each containing multiple capillaries, where N is any integer between 3 and 13, with the valve plate 140 nearest the outlet 118 being fixed with the preceding N−1 valve plates 142 being movable by rotation 134 of camshaft 130 by actuator 132. Camshaft 130 possesses multiple camshaft lobes 147 which engage the movable valve plates 142, thereby varying the area of each orifice "A" as in the first embodiment. Each camshaft lobe 147 is incrementally larger by one unit of the distance between capillary centers as one moves sequentially from the movable valve plate nearest the fixed plate 140 to that nearest the inlet 116 such that at any rotational position of the camshaft 130, the capillaries form a contiguous path through the N valve plates and are stairstepped to one another, such that when the high points of all of the camshaft lobes simultaneously engage their corresponding movable valve plates, the orifices formed at the intersection are completely closed and no fluid flows; when the low points of the camshaft lobes all simultaneously engage their corresponding movable valve plates, the capillaries are perfectly aligned and the orifices are completely open to fluid flow. Referring to FIG. 4a, an enlargement of FIG. 4, a fluid 166 flowing through said capillary path, with camshaft at an intermediate position between fully open and fully closed, encountering orifices 154 which will exert an upward force 160 when entering one of the multiple capillaries of the center movable valve plate 142 and which will exert a downward force 162 when leaving the same capillary of the same movable valve plate. In the present embodiment, the force 162 will offset the force 160 leaving a very small net force equal to the difference between force 160 and force 162 to be provided by the actuator 132 via the camshaft 130 and the camshaft lobe 147.

A practitioner in the art would be able to alter the depicted structure to permit individual actuation of each movable valve plate 142 or simultaneous actuation of a set of movable valve plates 142, which set includes less than all movable valve plates 142 of the valve apparatus 110. The optimal actuation scheme is dependent upon the specific application in which the valve apparatus 110 is to be used.

Figure 7:
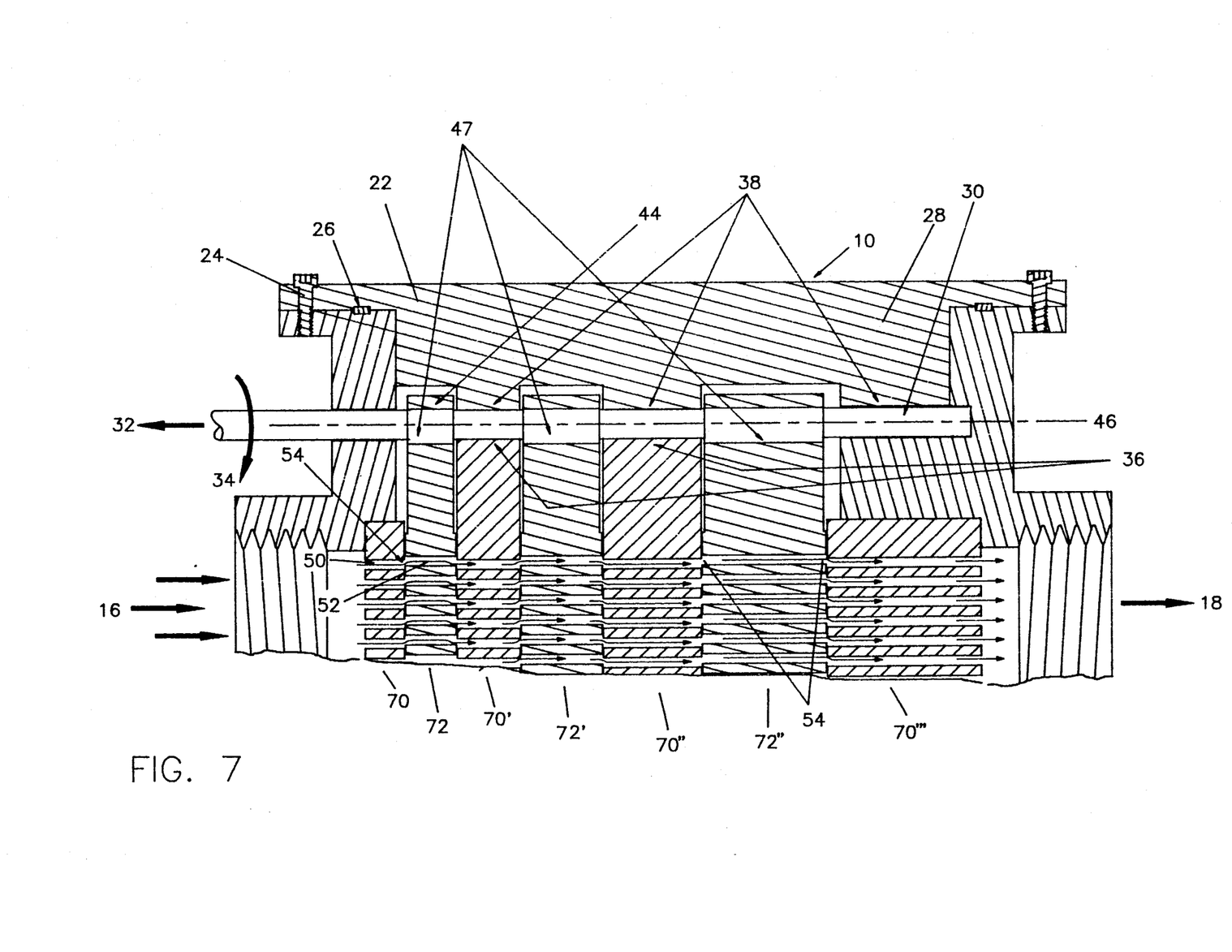
FIG. 7 is an elevation view, in longitudinal cross-section, showing the orifice-forming valve plates according of the invention, with said valve plates having different thicknesses.

Referring to FIG. 7, an elevation view in longitudinal cross-section of the invention, shows fixed valve plates 70, 70', 70" and 70"', with movable valve plates 72, 72' and 72", with the thickness of said plates varying according to the expected local fluid conditions at each of the multiple orifices 54 immediately preceding the said valve plates. FIG. 7 shows the thickness progressively increasing in the direction from inlet 16 to outlet 18, but other thickness permutations are feasible based upon operating conditions and a practitioner in the art would be able to alter the depicted structure to provide for such local fluid conditions.

Figure 5:
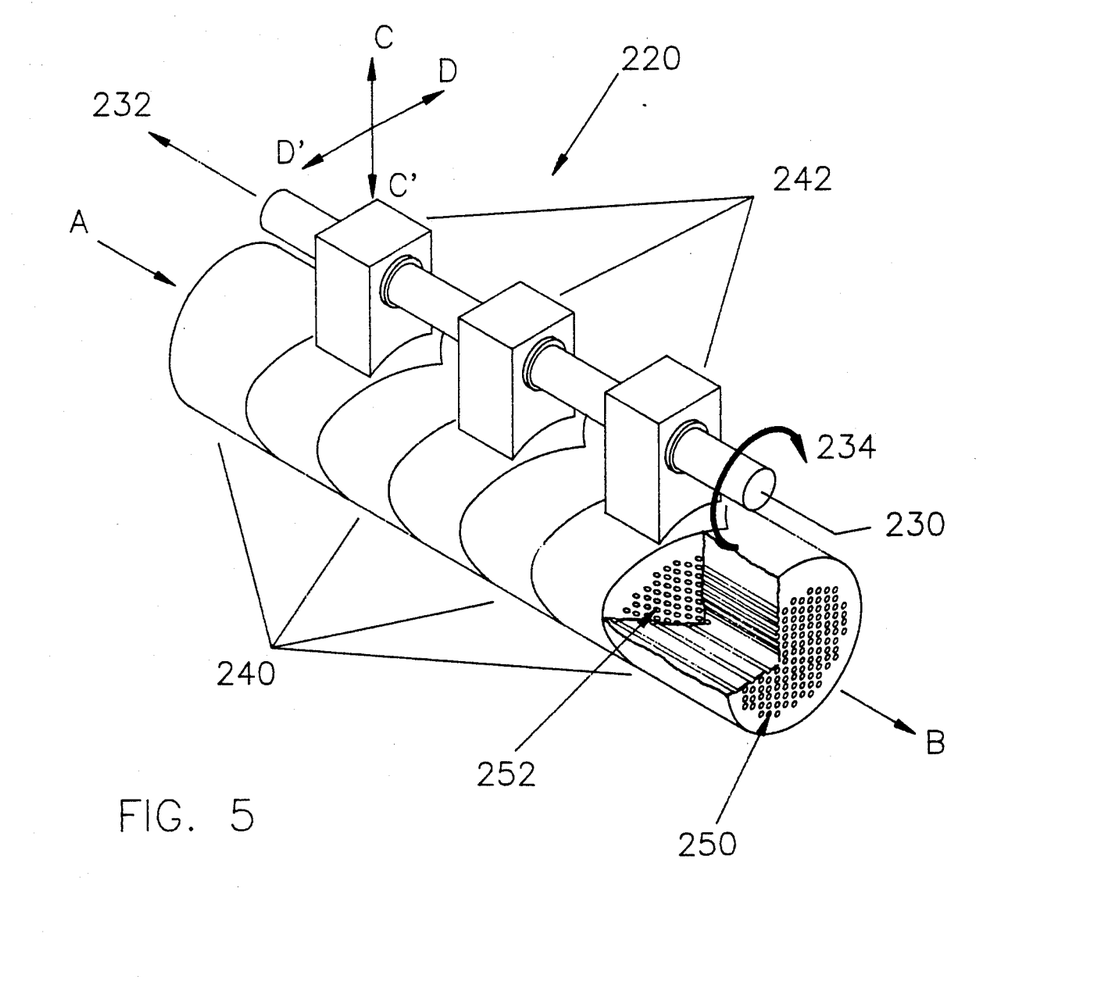
FIG. 5 is a perspective view of a multiple valve plate assembly of a quiet-high-pressure-reducing valve with self-alignment and improved erosion resistance properties according to the invention.
Figure 5A:
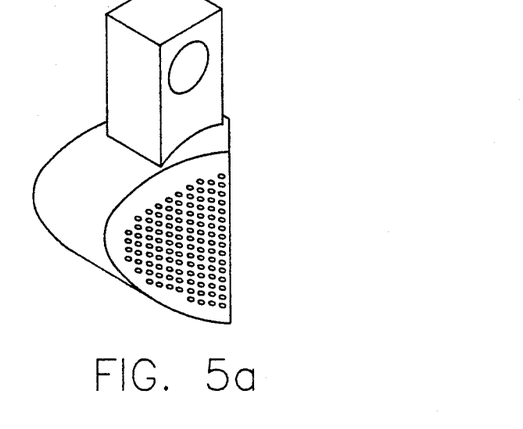
FIG. 5a is an enlargement of FIG. 5 showing a perspective view of a single valve-plate with self-alignment and improved erosion resistance properties according to the invention.

Referring to FIG. 5 a fluid entering the valve chamber 220 from an inlet and flowing in the direction of the arrow A, enters a plurality of valve plates exiting in the direction of the arrow B and continuing to an outlet, with said valve chamber being contained within a valve body as in the previous two embodiments. This form of the invention provides for reducing the erosion of the valve plates and provides for the self-alignment of the movable valve plates 242 relative to the fixed valve plates 240. The fluid force in the direction represented by the arrow A has a component at an angle to the principal surfaces of the movable valve plates 242 which forces alignment of the movable valve plates 242 relative to the fixed valve plates 240 in the directions represented by the arrows D and D' which are orthogonal to the direction of movement represented by the arrows C and C', caused by the rotation 234 of camshaft/camshaft lobe 230 by actuator 232. The shape of the valve plates is such that movement along the arrows D and D' centers the movable valve plates 242 within the crevice of the fixed valve plates 240. The valve plates are cut, with a wire EDM machine or a machine with similar capability, from one integral piece of material containing capillaries running axially through the material, with the cuts being in the form of chevrons as shown in FIG. 5a, and with the two ends being a normal cut with a circular cross-section. The fluid enters multiple capillaries at the concave base of the chevrons flowing in the direction of the arrow A and exits at the convex peak of the chevrons, in the direction represented by the arrow B, such that the fluid force against the inclined surfaces of the chevron cuts maintains the location of the apex of each chevron in the crevice of the adjacent valve plate. Orifices are formed by movement of alternate chevron-shaped valve plates along a direction parallel to that represented by the arrows C and C'. Erosion to the valve plate surfaces is reduced by the angle between the direction of fluid flow and the normal to the surface of the chevron cut, that is, the velocity component normal to the surface, "Vn", is reduced by the cosine of this angle.

Figure 8:
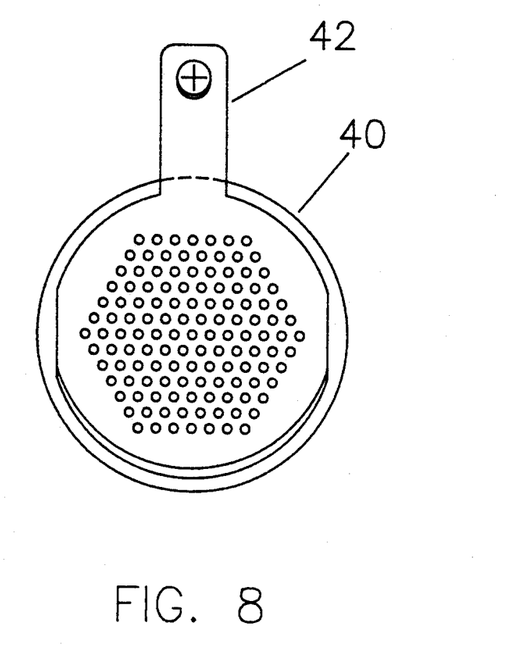
FIG. 8 is an elevation view, in longitudinal cross-section, showing the coatings on said valve plates.
Figure 8A:
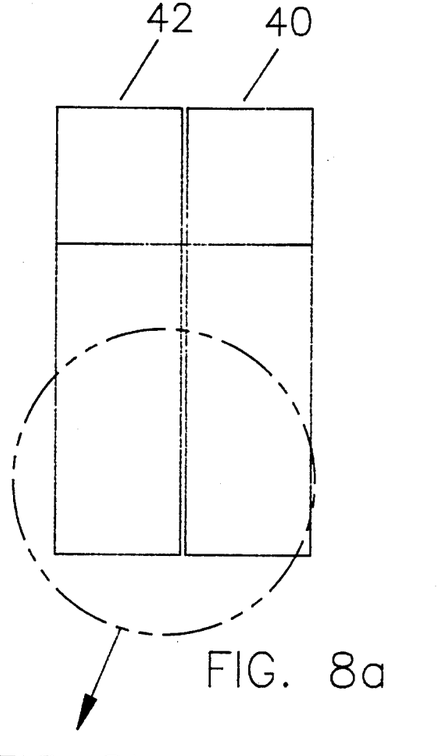
Figure 8B:
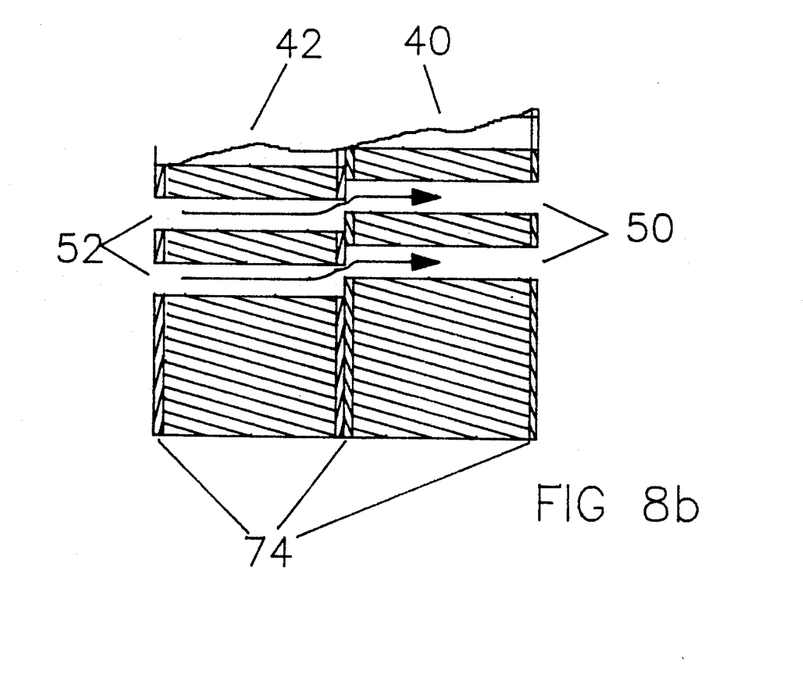

Referring to FIG. 8, another modification of the above embodiments is to place a coating 74 on the surface of fixed valve plate surfaces 40 and movable valve plate surfaces 42, with said coating being an erosion-resistant material with a high NEA number such as titanium-boride which may be applied by chemical vapor deposition or similar processes. Said coatings have a lower coefficient of mechanical coefficient of friction for surfaces rubbing against one another than ordinary valve materials, thereby reducing the force required to be exerted by the actuator, and thereby also reducing the required actuator energy to move the said valve plates relative to one another. This modification to the invention reduces erosion and friction between the valve plates which in turn reduces the required actuator force and energy requirements.

Figure 6:
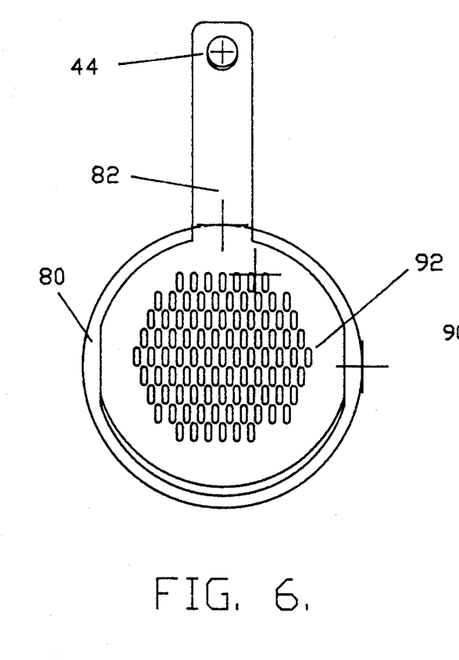
FIG. 6 is an end view of the quiet-high-pressure-reducing valve showing the movable and fixed valve plates as viewed from the valve inlet or valve outlet, said valve plates containing capillaries with cross-sectional aspect ratios greater than one.
Figure 6A:
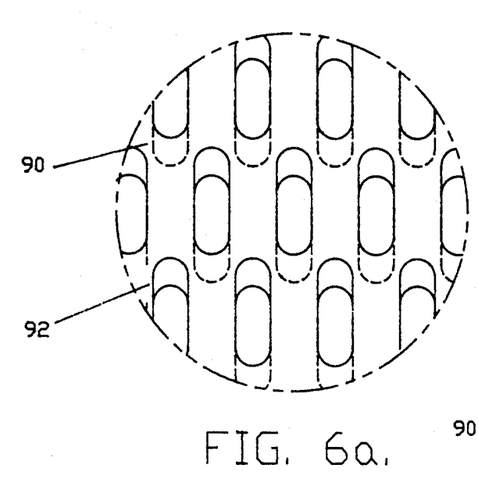
FIG. 6a is an enlargement of FIG. 6 showing the formation of orifices with aspect ratios greater than one.
Figure 6B:
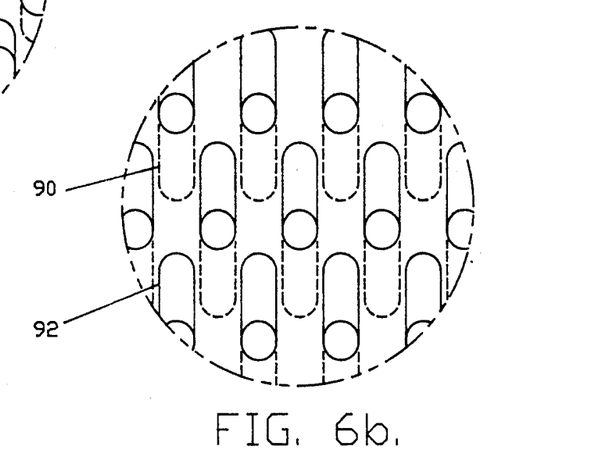
FIG. 6b is an enlargement of FIG. 6 showing the formation of orifices with aspect ratios less than one.
Figure 6C:
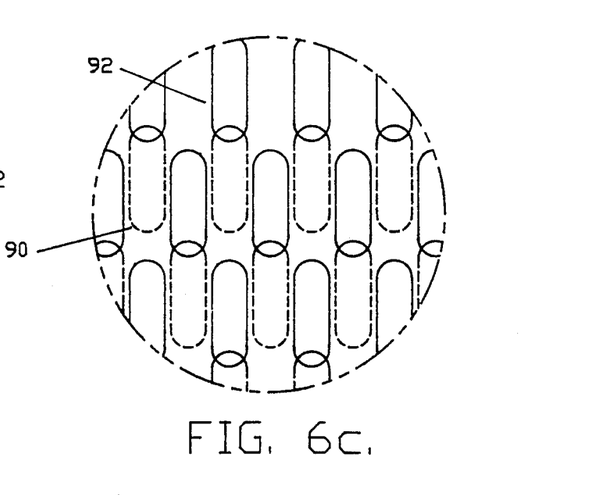
FIG. 6c is an enlargement of FIG. 6 showing the formation of orifices at the special case where the aspect ratio equals one.

Referring to FIG. 6, a further embodiment of the invention, shows an end view of fixed valve plates 80 containing multiple capillaries 90 and movable valve plates 82 containing multiple capillaries 92, with said capillaries having a shape with an aspect ratio of major axis to minor axis of greater than one. FIG. 6a and FIG. 6b are enlargements of FIG. 6 showing said movable and fixed valve plates offset with respect to one another as described in the previous embodiments of the invention such that the multiple orifices formed at the intersection of said valve plates have aspect ratios either greater than one as shown in FIG. 6a and less than one as shown in FIG. 6b, with said ratios being continuously adjustable by said movement means described earlier. This bifurcaton of the aspect ratio of said orifices also bifurcates the audible noise level between two frequencies, thereby spreading the noise spectrum and reducing individual intensity peaks.

What I claim is:

1. An energy efficient quiet-high-pressure-reduction device comprising:

(a) a plurality of plates with said plates having two principal surfaces, one being concave with one or more sharp crevices, the other being convex with matching apexes, such that when assembled with principal surfaces juxtaposition, said assembly said convex and concave surfaces mate;

(b) said plates containing multiple parallel capillaries transferring said plates between their principal surfaces in a direction normal to the end surfaces of the assembly of said plurality of plates;

(c) a fluid-tight valve body containing a chamber with an inlet and an outlet, said chamber containing a means of retaining said plates juxtaposition to one another such that their principal surfaces are adjacent and such that said capillaries form a contiguous passage through the said plurality of plates;

(d) a means of moving individual said plates discrete distances relative to one another in a direction parallel to said apex line of mating principal surfaces of said plates such that a plurality of orifices are defined by said capillaries being moved relative to one another at each of the interfaces formed at adjacent said plates, said orifices being adaptive in area from fully open, in which the orifice area equals capillary area, to fully closed and all incremental areas between fully open and fully closed, whereby fluid forces on said concave plate surfaces have a component which forces alignment of said plates with respect to their adjacent neighboring said plates, and whereby erosion is improved by reducing the incident angle of the fluid passing through the device, and whereby pressure reductions can be achieved by orifical area change as well as by friction losses through said capillaries.

2. The apparatus of claim 1 wherein said capillaries have a cross-sectional shape with a high friction coefficient, whereby a frictional pressure drop and transition from turbulent flow to laminar flow can be achieved in a shorter length thereby limiting the volume of fluid flow emitting acoustic noise.

3. The apparatus of claim 1 wherein said capillaries have a cross-sectional shape with an aspect ratio of major to minor axes either greater than one or less than one with the juxtaposition principal surfaces of said plates forming orifices which also have aspect ratios different than one, said orifices being continuously and adaptively adjustable, whereby the emitted audible acoustic noise over multiple frequencies as determined by the dimensions of the capillary shape is dispersed over frequencies determined by said major and minor capillary dimensions versus a uniform cross-sectional shape such as a circle.

4. The apparatus of claim 1 wherein said movement means comprises an actuator coupled to a camshaft passing through the wall of said valve body and entering said chamber wherein camshaft lobes on said camshaft engage appropriately shaped bearing surfaces on said plates causing movement of said plates as said actuator rotates said camshaft causing said camshaft lobes to displace said plates.

5. The apparatus of claim 1 wherein the individual said plates of said plurality of plates are each of a different thickness, said thickness being that dimension normal to said plates said principal surface, whereby the frictional length of said capillaries within said individual plates can be made longer or shorter depending upon the specific operating conditions at each said orifice.

6. The apparatus of claim 1 wherein the N−1 individual plates of said plurality of plates nearest the said inlet are engaged by said camshaft lobes of differing heights, said height being the distance between the said camshaft center and the apex of said camshaft lobes, said height difference being multiples of said capillary diameter such that from a longitudinal elevation view said capillaries within said plates bear a locational relationship of stairsteps such that a fluid entering each said capillary in each individual said plate undergoes a momentum change opposite that momentum change on exiting the same said plate such that the entry and exit forces approximately offset each other, the Nth plate nearest the said outlet being a load-bearing fixed plate, whereby the energy that the said actuator must expend is substantially reduced by balancing the said forces and therefore the response time the device exhibits from fully open to fully closed is correspondingly reduced.

7. The apparatus of claim 1 wherein cavitation in liquids undergoing pressure reductions is eliminated by incorporating multiple path pressure reductions wherein said paths occur multiple pressure reduction increments which are adaptively adjusted by said movement of said valve plates and therefore adaptive sizing of said orifices formed at the interfaces between said valve plates such that the pressure of the liquid at each said pressure reduction stage is never reduced below the liquid's vapor pressure at the local conditions existing at the location of the said pressure reduction, whereby cavitation is eliminated and thereby eliminating damage to the device components and audible noise from bubble implosion.

8. An energy efficient quiet-high-pressure-reduction device comprising:
 (a) a plurality of plates with said plates containing multiple parallel passages of capillary dimensions, with occluded diameter of the said capillaries exceeding 500 micrometers, transversing said plates between their principal surfaces, whereby low frequency audible noise is suppressed;
 (b) a fluid-tight valve body containing a chamber with an inlet and an outlet, said chamber containing a means of retaining said plates juxtaposition to one another such that their principal surfaces are adjacent and such that said capillaries form a contiguous passage through the said plurality of plates;
 (c) a means of moving individual said plates discrete distances relative to one another in directions lying in the planes of the principal surfaces of said plates such that a plurality of orifices are defined by said capillaries being moved relative to one another at each of the interfaces formed at adjacent said plates, said orifices being adaptive in area from fully open, in which the orifice area equals capillary area, to fully closed and all incremental areas between fully open and fully closed;
 (d) said movement means comprising an actuator coupled to a camshaft passing through the wall of said valve body and entering said chamber wherein said camshaft contains a plurality of lobes, each said lobe being of a different and unique contour and engaging an appropriately shaped bearing surface on a corresponding said plate causing the movement of each individual said plate in a direction parallel to its principal surfaces by an amount depending upon the specific shape of the said camshaft lobe engaging that particular plate, whereby the orifices formed at each interface between adjacent plates to have areal relationships such that the pressure drops at all said interfaces are approximately equal despite the fluid velocity progressively increasing as the fluid passes through the orifices formed at the interface formed by the two said plates nearest the entrance of said chamber to the orifices formed at the interfaces between adjacent plates more near the exit of the said chamber.

9. An energy efficient quiet-high-pressure-reduction device comprising:
 (a) a plurality of plates with said plates containing multiple parallel passages of capillary dimensions, with occluded diameter of the said capillaries exceeding 500 micrometers, transversing said plates between their principal surfaces, whereby low frequency audible noise is suppressed;
 (b) a fluid-tight valve body containing a chamber with an inlet and an outlet, said chamber containing a means of retaining said plates juxtaposition to one another such that their principal surfaces are adjacent and such that said capillaries form a contiguous passage through the said plurality of plates;
 (c) a means of moving individual said plates discrete distances relative to one another in directions lying in the planes of the principal surfaces of said plates such that a plurality of orifices are defined by said capillaries being moved relative to one another at each of the interfaces formed at adjacent said plates, said orifices being adaptive in area from fully open, in which the orifice area equals capillary area, to fully closed and all incremental areas between fully open and fully closed;
 (d) said plates of said plurality of plates are each of a different thickness, said thickness being that dimension normal to plate's said principal surfaces, with plate thicknesses increasing progressively from said valve entrance to said valve exit with plates nearest the entrance being thinnest and those nearest the exit thickest, whereby as the fluid velocity progressively increases as it passes from the valve entrance to the valve exit, more frictional area for transitioning from turbulent to laminar flow is made available between interfaces thereby reducing audible noise levels.

* * * * *